No. 821,155. PATENTED MAY 22, 1906.
T. R. CARLTON & J. D. MEADOW.
COMBINATION TOOL.
APPLICATION FILED DEC. 11, 1905.

Witnesses
C. H. Griesbauer

Inventors
Thomas R. Carlton
& James D. Meadow
by H. B. Willson
Attorney

UNITED STATES PATENT OFFICE.

THOMAS R. CARLTON AND JAMES D. MEADOW, OF SHERMAN, TEXAS.

COMBINATION-TOOL.

No. 821,155. Specification of Letters Patent. Patented May 22, 1906.

Application filed December 11, 1905. Serial No. 291,326.

*To all whom it may concern:*

Be it known that we, THOMAS R. CARLTON and JAMES D. MEADOW, citizens of the United States, residing at Sherman, in the county of Grayson and State of Texas, have invented certain new and useful Improvements in Combination-Tools; and we do declare the following to be a full, clear, and exact description of the invention, such as will enable others skilled in the art to which it appertains to make and use the same.

This invention relates to improvements in combination-tools.

The object of the invention is to provide a combined putty-knife, hammer and claw, and means whereby the hammer and claw may be firmly held in an open position for use and in a closed position when the putty-knife portion is being used.

With the above and other objects in view the invention consists of certain novel features of construction, combination, and arrangement of parts, as will be hereinafter described and claimed.

Figure 1:
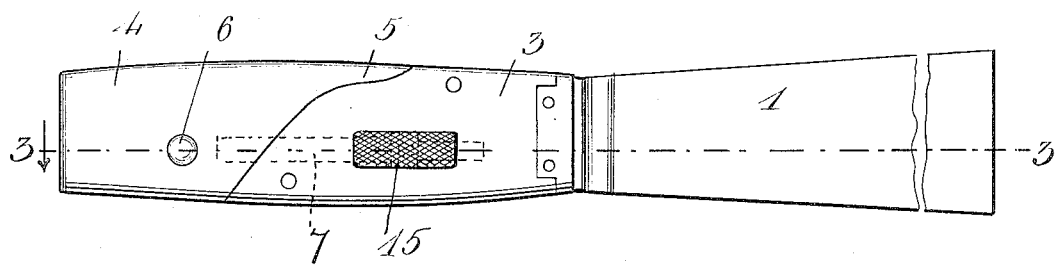
Figure 2:
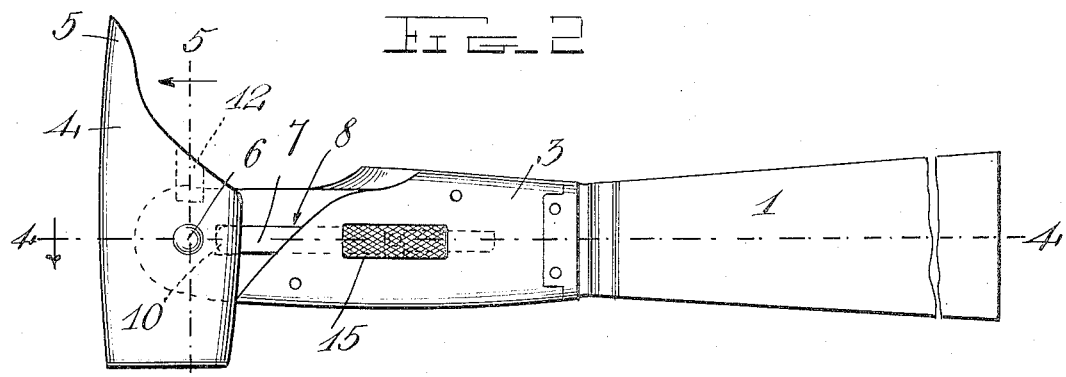
Figure 3:
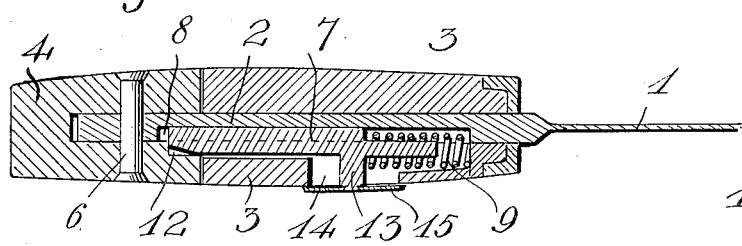
Figure 4:
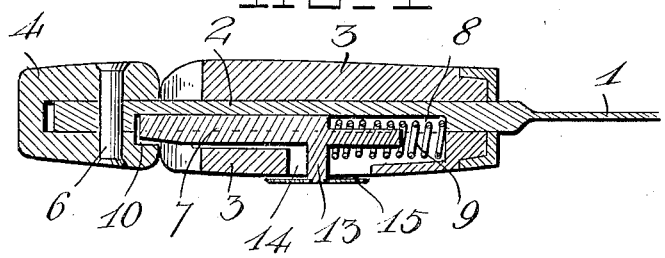
Figure 5:
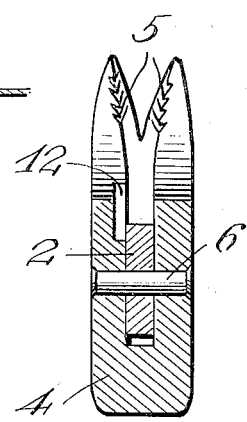

In the accompanying drawings, Figure 1 is a side view of the tool, showing the same arranged for use as a putty-knife. Fig. 2 is a similar view showing the parts arranged for use as a hammer. Fig. 3 is a longitudinal sectional view on the line 3 3 of Fig. 1. Fig. 4 is a similar view on the line 4 4 of Fig. 2, and Fig. 5 is a cross-sectional view on the line 5 5 of Fig. 2 looking toward the head or hammer end of the tool.

Referring more particularly to the drawings, 1 denotes the putty-blade, having a flat heavy stem or shank 2, to the inner portion of which is connected the side pieces 3 of the handle. The outer ends of the side pieces 3 are cut away, leaving the end of the shank 2 exposed or projecting beyond said side pieces.

Pivotally mounted on the projecting end of the shank 2 is a hammer-head 4, having formed on one end a claw 5. The hammer-head is provided on its inner side with a channel or recess, into which is adapted to be inserted the projecting end of the shank 2 of the putty-blade, and through said end of the shank and the sides of the hammer-head is inserted a pivot-pin 6, by means of which said hammer-head is pivotally connected to the shank to permit said head to be folded on the shank into alinement with the handle, of which it forms a part when so arranged. The sides of the handle are cut away in such shape as to receive and match with the shape of the inner side of the hammer-head and claws.

In order to hold the hammer-head in locked position when in and out of use, a suitable locking device is provided. Said device is here shown and is preferably in the form of a bolt 7, which is slidably mounted in a groove or channel 8, formed in the meeting faces of the side pieces and the shank on one side of the handle. The bolt 7 is provided on its inner end with a reduced stem around which is arranged a coil-spring 9. The inner end of said spring bears against the inner end of the groove or channel in which the bolt slides, thus normally projecting or forcing said bolt outwardly and causing the same to engage one of two locking-recesses 10 and 12, formed in the inner side of the hammer and claw head. The recess 10 is brought into alinement with the bolt when the head is turned to an operative position, at which time the bolt 7 automatically shoots into said recess and locks the hammer and claw in an open position for use. When the hammer-head is folded or brought to a closed position, the recess 12 will be brought into alinement with the bolt and is engaged thereby to hold said parts closed.

Connected with the bolt 7 is an outwardly-projecting stud 13, which works through a slot 14, formed in one of the side pieces of the handle, as shown, and to said stud is secured a serrated thumb-plate 15, which is adapted to slide on the side of the handle over the slot 14 when engaged by the thumb to retract the bolt 7. If desired, the claw 5 may be provided on its inner edges with teeth or serrations to facilitate the engagement of the claw with a nail.

Having thus described our invention, what we claim as new, and desire to secure by Letters Patent, is—

In a tool of the character described, a handle, a hammer-head and claw pivotally mounted on the shank of said handle and forming when in closed position a part of said handle, a locking-bolt slidably mounted in said handle to engage recesses formed in said hammer-head and claw when the same is in an open operative position or in a closed inoperative position, a spring arranged on said bolt to automatically project the same into engagement with said recesses, and a thumb-plate connected to said bolt whereby the same is retracted and disengaged from said recesses, substantially as described.

In testimony whereof we have hereunto set our hands in presence of two subscribing witnesses.

THOMAS R. CARLTON.
JAMES D. MEADOW.

Witnesses:
F. B. DILLARD,
MATTIE B. OSLIN.